(12) United States Patent
Hada et al.

(10) Patent No.: US 11,703,686 B2
(45) Date of Patent: *Jul. 18, 2023

(54) HEAD-UP DISPLAY

(71) Applicant: PANASONIC INTELLECTUAL PROPERTY MANAGEMENT CO., LTD., Osaka (JP)

(72) Inventors: Takato Hada, Osaka (JP); Tomoaki Miyamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/849,156

(22) Filed: Jun. 24, 2022

(65) Prior Publication Data
US 2022/0334390 A1 Oct. 20, 2022

Related U.S. Application Data

(63) Continuation of application No. 17/171,484, filed on Feb. 9, 2021, now Pat. No. 11,402,632.

(30) Foreign Application Priority Data

Feb. 14, 2020 (JP) ................................ 2020-023267
Nov. 5, 2020 (JP) ................................ 2020-185448

(51) Int. Cl.
  *G02B 27/01* (2006.01)
  *B60K 35/00* (2006.01)
(52) U.S. Cl.
  CPC .......... *G02B 27/0101* (2013.01); *B60K 35/00* (2013.01); *B60K 2370/1529* (2019.05);
(Continued)

(58) Field of Classification Search
  CPC .......... G02B 27/0101; G02B 2027/011; G02B 2027/0118; B60K 35/00; B60K 2370/1529
  See application file for complete search history.

(56) References Cited

U.S. PATENT DOCUMENTS 11,402,632 B2 * 8/2022 Hada ........................ G02B 5/10
2019/0339520 A1   11/2019 Miyamoto
2020/0271927 A1   8/2020 Kawana

FOREIGN PATENT DOCUMENTS

WO    2019/093085    5/2019

* cited by examiner

*Primary Examiner* — Ryan D Howard
(74) *Attorney, Agent, or Firm* — Greenblum & Bernstein, P.L.C.

(57) ABSTRACT

A head-up display includes: a display medium; a display that displays an image; and a projection optical system that forms a virtual image by guiding the image displayed by the display to the display medium. The projection optical system includes a first mirror disposed above the display and reflecting display light of the image. $3<\alpha-(\theta+\varphi)/2<11.7$ is satisfied, where $\theta$ denotes an angle between a line segment connecting centers of the first mirror and the display and a normal line at the center of the first mirror, $\alpha$ denotes an angle between the line segment connecting the centers of the first mirror and the display and a normal line at the center of the display, and $\varphi$ denotes an inclination angle at an edge of the first mirror closer to the display relative to the center of the first mirror.

19 Claims, 8 Drawing Sheets

(52) U.S. Cl.
CPC ...... *B60K 2370/23* (2019.05); *B60K 2370/31* (2019.05); *B60K 2370/334* (2019.05); *B60K 2370/785* (2019.05); *G02B 2027/0118* (2013.01)

When α < 0

FIG. 5

When 2α−θ−φ < 0

When projecting image

FIG. 10

When light from outside enters

HEAD-UP DISPLAY

CROSS REFERENCE TO RELATED APPLICATIONS

This is a continuation of U.S. patent application Ser. No. 17/171,484, filed Feb. 9, 2021, which claims the benefit of Japanese Patent Application No. 2020-023267, filed Feb. 14, 2020, and Japanese Patent Application No. 2020-185448, filed Nov. 5, 2020. The entire disclosure of each of the above-identified applications, including the specification, drawings, and claims, is incorporated herein by reference in its entirety.

FIELD

The present disclosure relates to a head-up display provided in, for example, a vehicle.

BACKGROUND

Conventionally, a head-up display provided in, for example, a vehicle has been proposed (see Patent Literature (PTL) 1). PTL 1 discloses a head-up display that includes two mirrors.

CITATION LIST

Patent Literature

PTL 1: WO 2019/093085

SUMMARY

Technical Problem

However, the head-up display disclosed in PTL 1 can still be improved. In view of this, the present disclosure provides a head-up display by improving upon the above related art.

Solution to Problem

A head-up display according to the present disclosure includes: a display medium onto which a virtual image is projected; a display that displays an image; and a projection optical system that forms the virtual image on a side opposite an observer across the display medium by guiding the image displayed by the display to the display medium. The projection optical system includes a first mirror that is disposed above the display and reflects display light of the image, and an expression of $3<\alpha-(\theta+\varphi)/2<11.7$ is satisfied, where $\theta$ denotes an angle between a line segment that connects a center of the first mirror and a center of the display and a first normal line at the center of the first mirror, $\alpha$ denotes an angle between the line segment that connects the center of the first mirror and the center of the display and a second normal line at the center of the display, and $\varphi$ denotes an inclination angle at an edge of the first mirror relative to the center of the first mirror, the edge being closer to the display.

Advantageous Effects

A head-up display according to an aspect of the present disclosure can achieve further improvement.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS (Underlying Knowledge Forming Basis of Present Disclosure)

A display device provided in a vehicle, such as a head-up display, is a device that allows a user operating the vehicle such as a driver to see various types of vehicle-related information in the form of images (visual information that includes, for example, numbers, text, and graphics such as arrows). In particular, a head-up display allows a user to see an image as a virtual image by projecting and reflecting an image on a windshield (windscreen) or a combiner disposed in a front portion of a cockpit of a vehicle by using the windshield or the combiner as a display medium. At this time, the windshield or the combiner is translucent, so that the user sees, together with the virtual image, light that enters from the outside of the vehicle as a view that is seen through the windshield.

Figure 9:
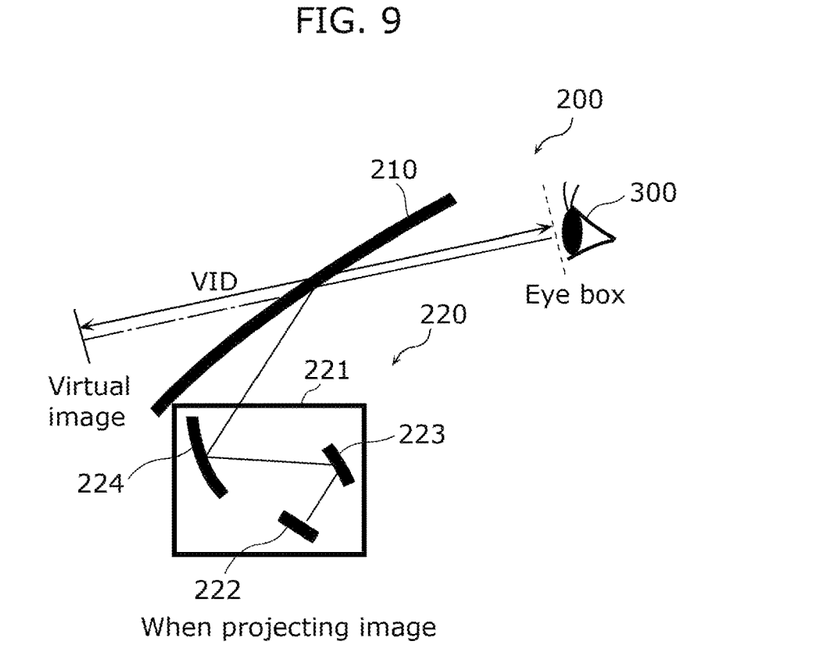
FIG. 9 is a schematic diagram for illustrating a head-up display according to a comparative example.

FIG. 9 is a schematic diagram for illustrating head-up display 200 according to a comparative example. Specifically, FIG. 9 is a schematic diagram illustrating a state in which a virtual image is formed. Head-up display 200 according to the comparative example is a small head-up display, and may be a smaller head-up display disclosed in PTL 1 stated in the Background section. Note that "smaller" here means a shorter distance between display 222 and first mirror 223, which is later described.

FIG. 9 illustrates head-up display 200 according to the comparative example cut through a cross section passing through display medium 210 and extending in a vertical direction viewed from eye 300 of a driver. FIG. 9 can be regarded as a cross sectional view cut through a cross section passing through a straight line that connects display medium 210 and eye 300 of the driver and extending in a vertical direction viewed from eye 300 of the driver, when the vehicle is viewed from the side. Here, FIG. 9 illustrates an example in which display medium 210 is a windshield. FIG. 9 illustrates a virtual image that a user sees and a light ray projected from projector 220 to form the virtual image, using solid lines, for convenience. Note that hatching indicating a cross section is omitted for convenience.

As illustrated in FIG. 9, head-up display 200 includes display medium 210 and projector 220. Projector 220 includes casing 221, display 222, first mirror 223, and second mirror 224. In casing 221, display 222, first mirror 223, and second mirror 224 are stored, and an opening (not illustrated) through which light traveling from second mirror 224 toward display medium 210 passes is formed.

Head-up display 200 according to the comparative example forms a virtual image that the user can see, using an image that projector 220 projects onto and reflects off display medium 210. Head-up display 200 is designed to cause reflected light that is display light from display 222 of projector 220 reflected by a plurality of mirrors (for example, first mirror 223 and second mirror 224) to enter eye 300 of the driver via display medium 210.

Figure 10:
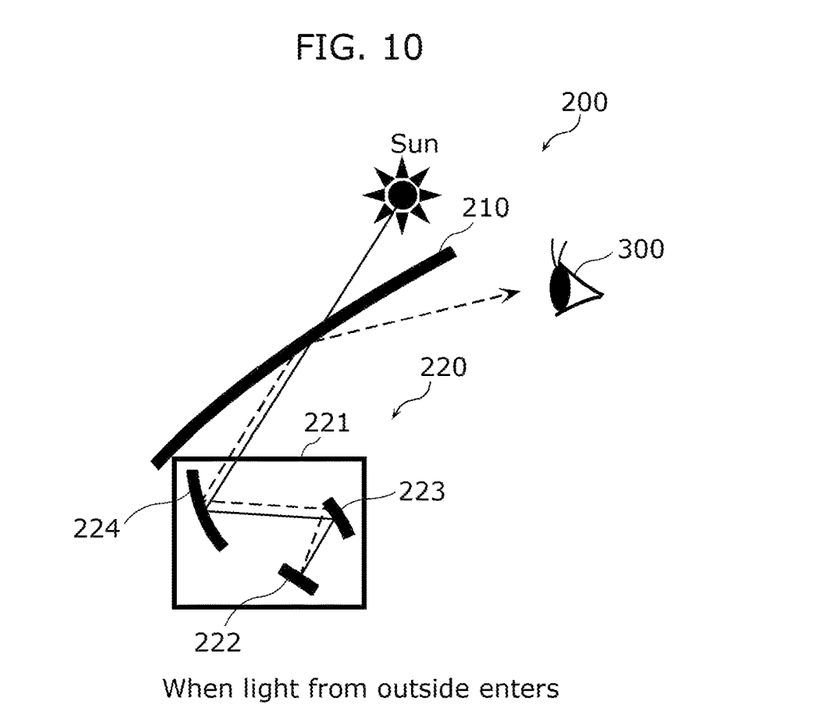
FIG. 10 is a schematic diagram illustrating a state where sunlight enters the head-up display according to the comparative example.

The case where light from the outside such as sunlight enters head-up display 200 as stated above is to be described. FIG. 10 is a schematic diagram illustrating an optical path when sunlight enters head-up display 200 according to the comparative example. Note that FIG. 10 illustrates only typical light out of the sunlight that has entered head-up display 200.

As illustrated in FIG. 10, the light that enters display medium 210 is reflected by second mirror 224, first mirror 223, and display 222 in this order. Here, if a head-up display that is not small is used, light reflected by display 222 travels towards a position other than first mirror 223. Yet, in head-up display 200 that is small, the distance between display 222 and first mirror 223 is short, and thus light reflected by display 222 is reflected by first mirror 223, second mirror 224, and display medium 210 in this order and reaches eye 300 of the driver (see the broken line in FIG. 10). This light is dangerous when driving and affects health of the driver.

A head-up display is often disposed in a dashboard, and thus is desirably small, considering a space for disposing the head-up display and other devices. However, as described above, if the size of head-up display 200 according to the comparative example is reduced, sunlight is reflected inside of head-up display 200 and consequently reaches eye 300 of the driver. For example, the head-up display according to PTL 1 has a problem that if the size of the head-up display is reduced, sunlight that has entered the head-up display may be reflected inside and reach the eye(s) of an observer (for example, a driver). Accordingly, the size reduction of head-up display 200 according to the comparative example has a limit.

In view of this, the present inventors have diligently examined head-up displays that can prevent sunlight from reflecting inside and reaching the eye(s) of a driver even if the size of the head-up display is reduced, and have conceived a head-up display as described below.

A head-up display according to an aspect of the present disclosure includes: a display medium onto which a virtual image is projected; a display that displays an image; and a projection optical system that forms the virtual image on a side opposite an observer across the display medium by guiding the image displayed by the display to the display medium. The projection optical system includes a first mirror that is disposed above the display and reflects display light of the image, and a first expression of $3<\alpha-(\theta+\varphi)/2<11.7$ is satisfied, where $\theta$ denotes an angle between a line segment that connects a center of the first mirror and a center of the display and a first normal line at the center of the first mirror, $\alpha$ denotes an angle between the line segment that connects the center of the first mirror and the center of the display and a second normal line at the center of the display, and $\varphi$ denotes an inclination angle at an edge of the first mirror relative to the center of the first mirror, the edge being closer to the display.

Accordingly, the head-up display can prevent sunlight reflected by the first mirror and thereafter reflected by the display and again falling onto the first mirror from traveling back. Thus, the head-up display can prevent sunlight from being reflected inside and reaching the eye(s) of a driver even if the size of the head-up display is reduced. Thus, a further improved head-up display can be achieved.

For example, the $\alpha$ may further satisfy a second expression of $3<\alpha-2(\theta+\varphi)/3<5.7$.

Accordingly, even if an optical path of sunlight that travels in the head-up display is other than a predetermined optical path, sunlight reflected by the first mirror and thereafter reflected by the display and again falling onto the first mirror can be prevented from traveling back.

For example, the head-up display may further include: a second mirror that reflects the display light from the first mirror toward the display medium. A third expression of $0.3<L1/L2<0.6$ may be satisfied, where L1 denotes a length of the line segment that connects the center of the display and the center of the first mirror, and L2 denotes a length of a line segment that connects the center of the first mirror and a center of the second mirror.

Accordingly, the display can be prevented from blocking display light from the first mirror, and furthermore the size of the head-up display can be reduced.

For example, a reflection surface of a portion of the second mirror that includes the center of the second mirror may be concave.

Accordingly, the position of a principal point of the optical system shifts along an optical path to the side opposite the display, and thus the display can be brought closer to the first mirror so that the size of the head-up display can be further decreased.

For example, the $\varphi$ may satisfy a fourth expression of $\varphi<3$ degrees.

Accordingly, the degrees of freedom of angles $\theta$ and $\alpha$ may be increased.

For example, a fifth expression of $D/VID<0.04$ may be satisfied, where D denotes a length of the first mirror in a vertical direction, and VID denotes a length of a line segment that connects a center of an eye box and a display center of the virtual image.

Accordingly, the size of the first mirror is decreased, and thus the size of the head-up display can be further decreased. Furthermore, the head-up display can readily cause sunlight reflected by the display to travel toward a position other than the first mirror, and thus can further prevent the reflected light from reaching the eye(s) of the driver.

For example, at least a portion of a reflection surface of the first mirror at an outer edge may be concave.

Accordingly, in the head-up display, the position of a principal point of the optical system shifts toward the display along an optical path, and thus even if the display and the first mirror are close to each other due to, for instance, the shape of the display medium (for example, a windshield) and the position in which the head-up display is provided, the distance between the first mirror and the display is increased, and the display can be prevented from blocking display light reflected by the first mirror.

For example, the head-up display may be provided in a vehicle, and the display medium may be a windshield.

Accordingly, the head-up display can prevent sunlight that enters through the windshield from being reflected inside and reaching the eye(s) of the driver.

For example, the second mirror may be disposed on an optical path of the display light from the display toward the display medium, the second mirror being closer to the display medium than the first mirror.

Accordingly, the head-up display can prevent sunlight from being reflected inside and reaching the eye(s) of the driver, even if the size of the head-up display is reduced when the head-up display has a configuration in which the second mirror is disposed on the optical path, closer to the display medium than the first mirror.

For example, the first mirror may be disposed on the optical path, the first mirror being closest to the display in the projection optical system, and the second mirror may be disposed on the optical path, the second mirror being closest to the display medium in the projection optical system.

Accordingly, the head-up display can prevent sunlight from being reflected inside and reaching the eye(s) of the driver, even if the size of the head-up display is reduced when the head-up display has a configuration in which the first mirror is disposed, on the optical path, closest to the display in the projection optical system, and the second mirror is disposed, on the optical path, closest to the display medium in the projection optical system.

For example, the second mirror may be disposed above the display and below the display medium.

Accordingly, the head-up display can prevent sunlight from being reflected inside and reaching the eye(s) of the driver, even if the size of the head-up display is reduced when the head-up display has a configuration in which the second mirror is disposed above the display and below the display medium.

For example, a reflection surface of the first mirror may be convex.

Accordingly, the head-up display can prevent sunlight from being reflected inside and reaching the eye(s) of the driver, even if the size of the head-up display is reduced when the head-up display has a configuration in which the first mirror has a convex reflection surface.

For example, a reflection surface of the second mirror may be convex.

Accordingly, the head-up display can prevent sunlight from being reflected inside and reaching the eye(s) of the driver, even if the size of the head-up display is reduced when the head-up display has a configuration in which the second mirror has a convex reflection surface.

The following specifically describes an embodiment according to the present disclosure, with reference to the drawings.

Note that embodiments and variations described below each show a general or specific example. The numerical values, shapes, materials, elements, and the arrangement and connection of the elements, for instance, described in the following embodiments and variations are mere examples, and thus are not intended to limit the present disclosure. Among the elements in the following embodiments, elements not recited in any of the independent claims defining the most generic part of the present disclosure are described as arbitrary elements.

The drawings are schematic diagrams, and do not necessarily provide strictly accurate illustration. In the drawings, the same numeral is given to a substantially same configuration, and a redundant description thereof may be omitted or simplified.

In the Specification of the present application, a term that indicates a relation between elements such as "parallel", a term that indicates the shape of an element such as "concave shape", a numerical value, and a numerical range are not expressions that have only strict meanings, but are expressions that include substantially equivalent ranges, that is, a difference of about several percent, for example.

In the Specification of the present application, the terms "above" and "below" do not necessarily indicate above (vertically above) and below (vertically below) in absolute space recognition, and are defined based on a relative positional relation between a display medium and a projector. Out of a display medium and a projector, "above" means the side where the display medium is disposed, and "below" means the side where the projector is disposed. Furthermore, the expression such as "vertically below" includes substantially vertically below.

Embodiment

[1. Configuration of Head-Up Display]

Figure 1:
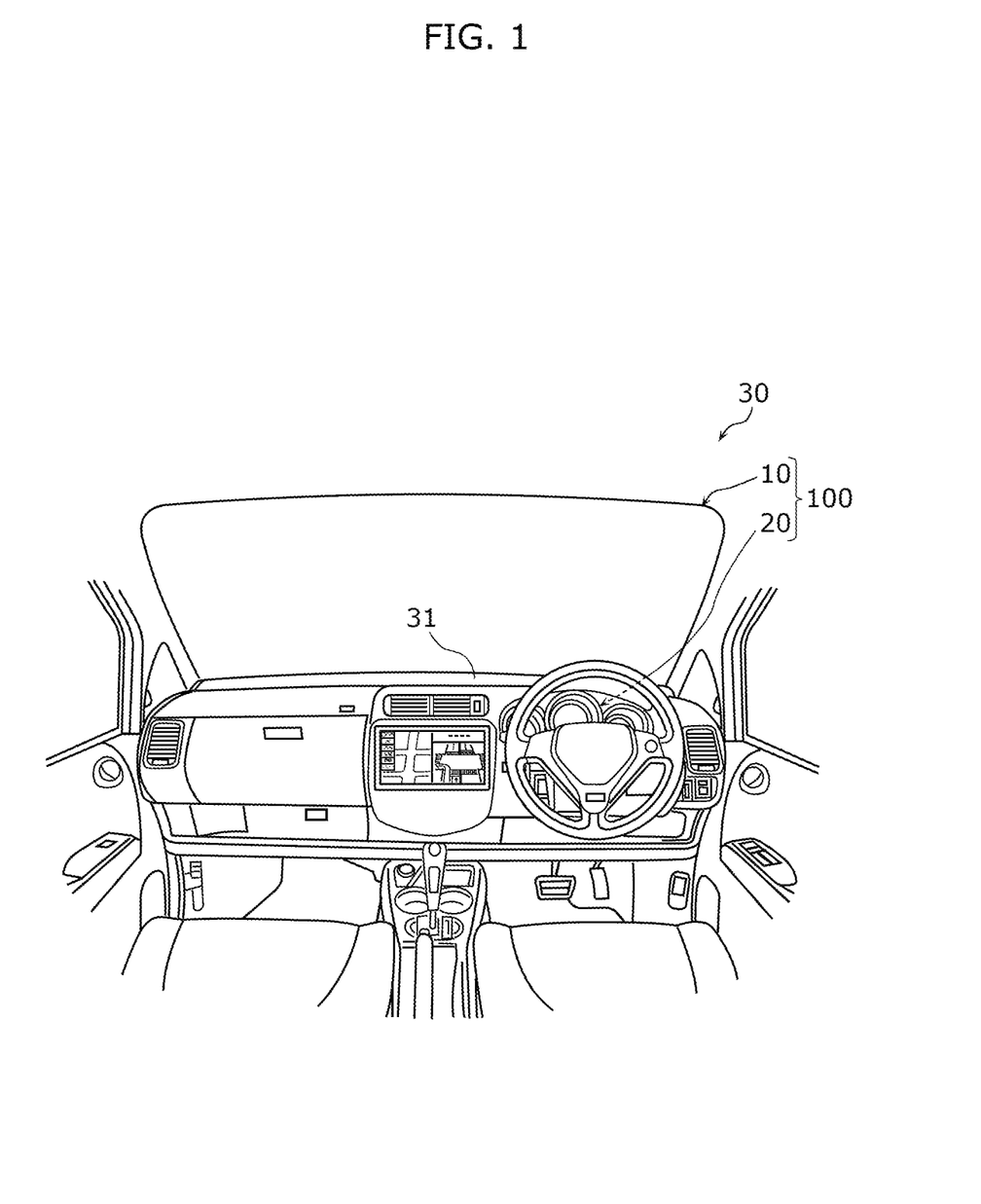
FIG. 1 is a schematic diagram when a head-up display according to an embodiment is viewed from the inside of a vehicle.

First, a head-up display according to an embodiment is to be described. FIG. 1 is a schematic diagram when head-up display 100 according to the embodiment is viewed from the inside of a vehicle.

As illustrated in FIG. 1, head-up display 100 according to the present embodiment is provided in vehicle 30 and forms a virtual image. A driver of vehicle 30 sees the virtual image as if the virtual image is present ahead and outside of vehicle 30, for example. Head-up display 100 is provided inside of dashboard 31 of vehicle 30. Note that in FIG. 1, projector 20 is disposed in dashboard 31 in which head-up display 100 is provided. A driver is an example of an observer who sees a virtual image formed by head-up display 100.

As illustrated in FIG. 1, head-up display 100 includes display medium 10 and projector 20.

Display medium 10 allows the driver to see a virtual image of an image projected, being superimposed on a view seen through display medium 10. Display medium 10 is a translucent member, and is achieved by a windshield or a combiner. A virtual image is projected onto display medium 10. The present embodiment describes an example in which display medium 10 is a windshield. Display medium 10 is disposed above projector 20.

Projector 20 forms a virtual image that the driver can see, using an image projected onto and reflected by display medium 10. An image projected from projector 20 is reflected by display medium 10 and enters eye 300 of the driver. Accordingly, projector 20 allows the driver to see a virtual image of an image projected, being superimposed on a view seen through display medium 10 of vehicle 30 since display medium 10 is translucent.

Figure 2:
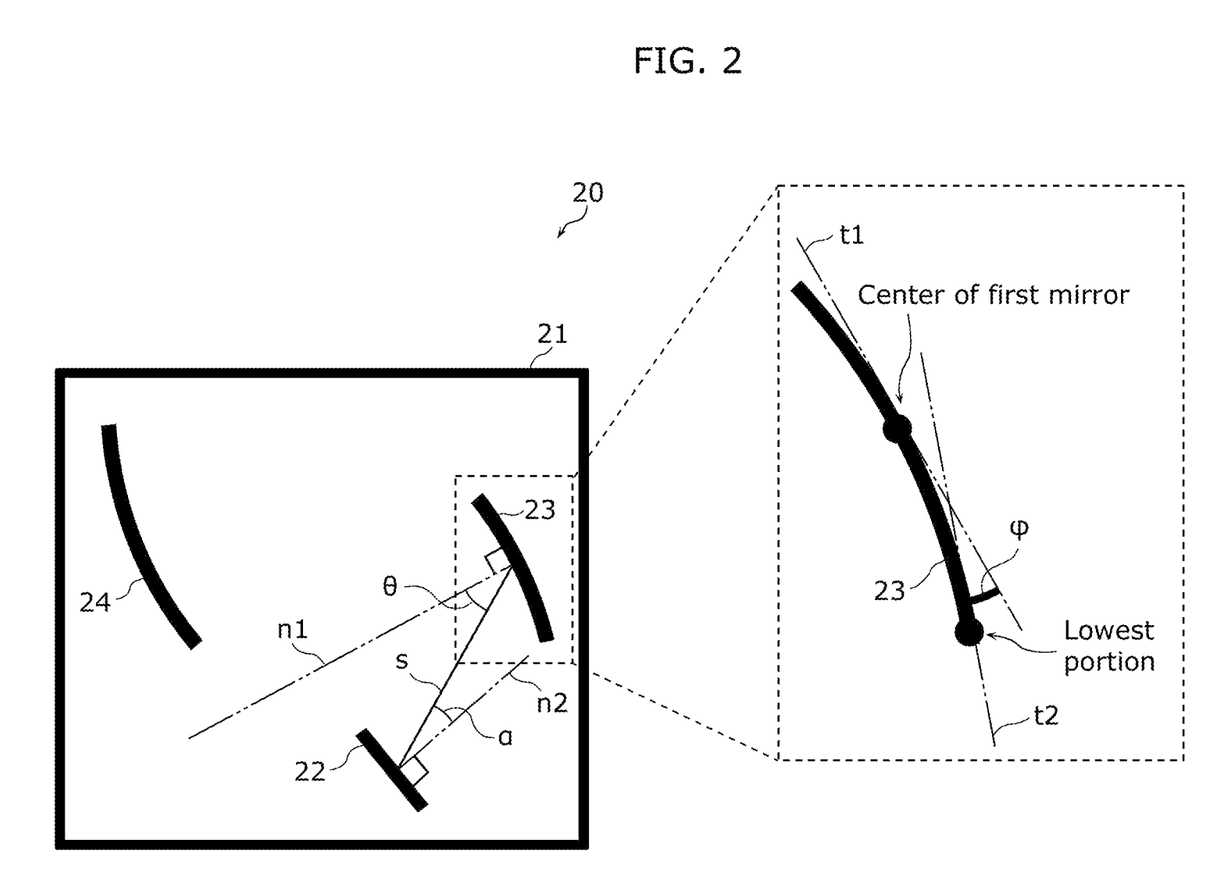
FIG. 2 illustrates internal configurations of the head-up display according to the embodiment.

FIG. 2 illustrates internal configurations of head-up display 100 according to the embodiment. Specifically, FIG. 2 is a cross-sectional view illustrating a configuration of projector 20. FIG. 2 is a cross-sectional view when head-up display 100 is cut along a cross section the same as FIG. 9.

As illustrated in FIG. 2, projector 20 includes casing 21, display 22, first mirror 23, and second mirror 24.

Casing 21 stores display 22, first mirror 23, and second mirror 24. Casing 21 is, for example, a resin-molded product and disposed inside of dashboard 31 of vehicle 30. An opening through which light traveling from second mirror 24 to display medium 10 passes (not illustrated) is formed in casing 21.

Display 22 displays an image to be seen by the driver as a virtual image. Display 22 is a liquid crystal display (LCD), for example. Note that display 22 may be a device other than an LCD, such as, for example, an organic light emitting diode (an electroluminescent diode) or a vacuum fluorescent display (a seven-segment display). Display 22 may be a projector or a scanning laser. Such display 22 is stored on the bottom side of casing 21, and displays an image upward and rearward of vehicle 30.

First mirror 23 and second mirror 24 are examples of mirrors included in a projection optical system. The projection optical system guides an image displayed by display 22 to form a virtual image on a side opposite the driver across display medium 10.

Upon receiving display light of an image displayed by display 22, first mirror 23 reflects the display light toward second mirror 24. For example, first mirror 23 reflects display light to the front side of vehicle 30. First mirror 23 is disposed on an optical path from display 22 toward display medium 10, being closest to display 22 in the projection optical system. First mirror 23 is disposed above display 22.

A reflection surface of first mirror 23 is concave, for example. At least a portion of the reflection surface at an outer edge of first mirror 23 may be concave. Stated differently, the outer edge of first mirror 23 is a reflection surface, and at least a portion of the reflection surface may be concave.

Second mirror 24 guides display light from display 22 toward display medium 10 via first mirror 23. Upon receiving display light from first mirror 23, second mirror 24 reflects the display light toward display medium 10. For example, second mirror 24 reflects light to the upper rear side of vehicle 30. As a result, upon receiving display light from second mirror 24, display medium 10 reflects the display light toward a visual point of the driver. Accordingly, the driver can see a road and objects such as a pedestrian and a structure ahead and outside of vehicle 30, and also a virtual image superimposed on the objects.

Second mirror 24 is disposed on an optical path from display 22 toward display medium 10, and is closer to display medium 10 than first mirror 23. Second mirror 24 is disposed above display 22. Second mirror 24 may be disposed closest to display medium 10 in the projection optical system, on the optical path. In this case, second mirror 24 is disposed vertically below display medium 10.

A reflection surface of second mirror 24 is concave, for example. A portion of the reflection surface of second mirror 24 that includes the center may be concave. Note that a portion of the reflection surface of second mirror 24 that includes the center represents a region that includes the center of second mirror 24 and furthermore is about 10% of the area of second mirror 24. The center of second mirror 24 is a centroid of second mirror 24 (for example, a position at the center of gravity). The area may be a projected area or a surface area of the reflection surface.

Here, various angles of elements included in projector 20 are to be described with reference to FIG. 2. Note that angles θ, α, and φ described below are angles in the cross section illustrated in FIG. 2. In the present embodiment, angles θ, α, and φ are angles when vehicle 30 is viewed from the left in a state in which the left on the drawing is the front side of vehicle 30 and the right on the drawing is the rear side of vehicle 30.

Angle θ is an angle between line segment s that connects the center of first mirror 23 and the center of display 22 and normal line n1 at the center of first mirror 23. Note that the center of first mirror 23 is a centroid of first mirror 23, for example, and the center of display 22 is the center of a region in which an image is displayed to form a virtual image (for example, display image 400 illustrated in FIG. 8 described later). When display 22 is covered with a member (for example, a plate-shaped member) having an opening through which display light passes, the center of display 22 may be the center of the opening. Angle θ is positive when formed by rotation from normal line n1 in a direction downward relative to normal line n1, that is, in the counterclockwise direction in the example in FIG. 2 (see the arrow showing the direction of rotation forming angle θ in FIG. 3 described later). FIG. 2 illustrates the case where angle θ is positive. Normal line n1 is an example of a first normal line.

Angle α is formed between line segment s and normal line n2 at the center of display 22. Angle α is positive when formed by rotation from normal line n2 in the direction upward relative to normal line n2, that is, in the counterclockwise direction in the example in FIG. 2. FIG. 2 illustrates when angle α is positive. Normal line n2 is an example of a second normal line.

Angle φ is an angle of inclination at an edge of first mirror 23 closer to display 22 (for example, a lower edge) relative to the center of first mirror 23. Specifically, angle φ is formed between tangent line t2 at the edge closer to display 22 and tangent line t1 at the center of first mirror 23. Angle φ is positive when formed by rotation from tangent line t1 in the clockwise direction in the example in FIG. 2. FIG. 2 illustrates the case where angle φ is positive, and angle φ is positive when the reflection surface of first mirror 23 is concave as illustrated in FIG. 2. Note that the edge of first mirror 23 closer to display 22 may be at the lowest portion of first mirror 23, for example.

Angle φ may satisfy Expression 1 below.

$$\varphi < 3 \text{ deg.} \qquad \text{(Expression 1)}$$

Figure 3:
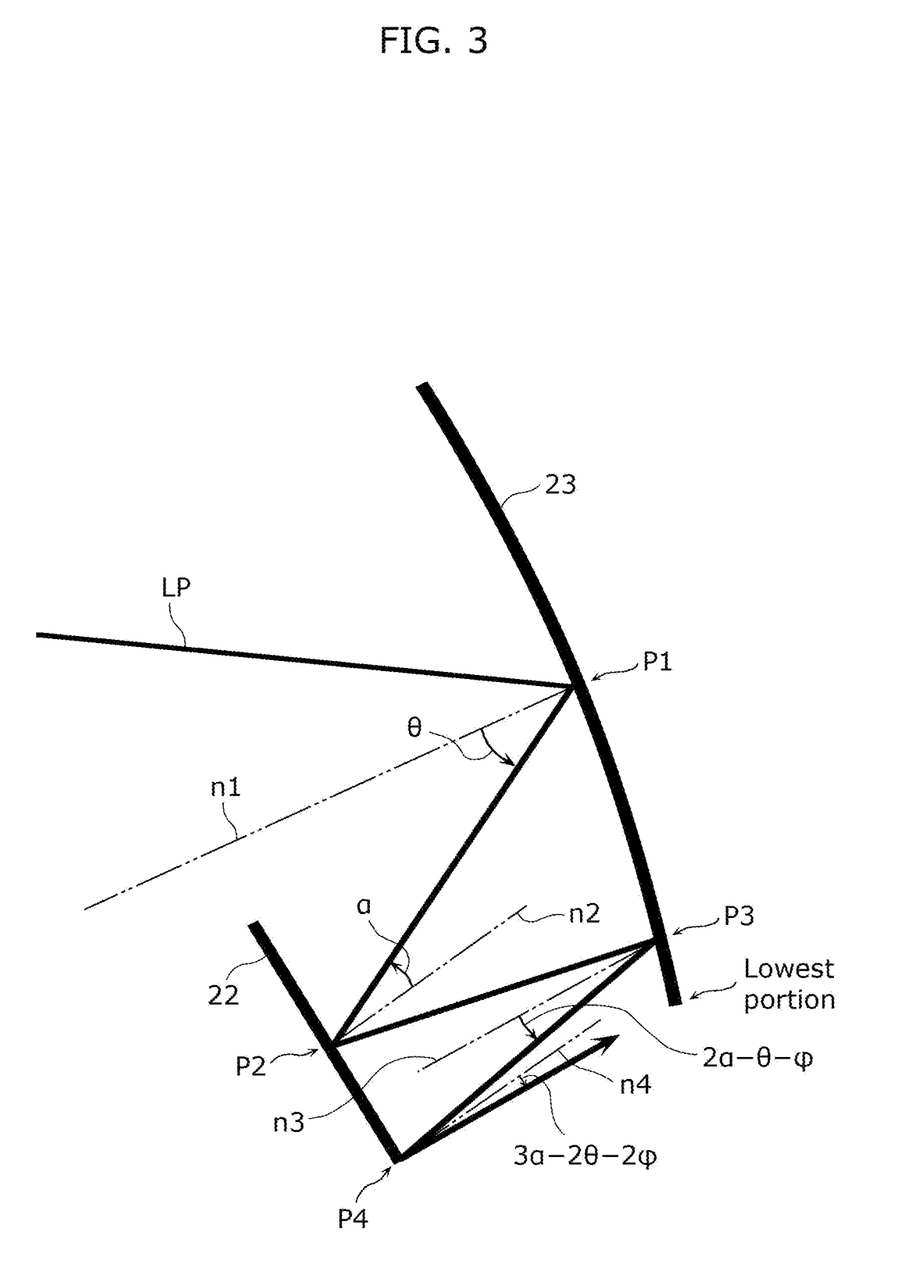
FIG. 3 is a diagram for illustrating conditions for reducing reflection of sunlight in the head-up display according to the embodiment.

The following describes conditions that can prevent sunlight from being reflected inside of head-up display 100 and reaching eye 300 of the driver. FIG. 3 is a diagram for illustrating conditions for reducing reflection of sunlight in head-up display 100 according to the embodiment. FIG. 3 illustrates display 22 and first mirror 23 included in head-up display 100 according to the present embodiment. Note that a solid line illustrated in FIG. 3 indicates optical path LP of sunlight incident on the center of first mirror 23 at angle θ. Optical path LP shows a typical optical path of sunlight, and is a typical optical path of sunlight traveling toward eye 300 of the driver when sunlight that travels along optical path LP is reflected inside of head-up display 100 and travels back. The angle of incidence and the angle of reflection are the same (resulting in specular reflection).

As illustrated in FIG. 3, if sunlight falls on first mirror 23 at position P1, the sunlight is reflected at a reflection angle of angle θ. Position P1 is the center of first mirror 23, for example. Sunlight reflected by first mirror 23 falls on display 22 at position P2. Position P2 is the center of display 22, for example. The angle of incidence of sunlight at this time is angle α. If sunlight falls on display 22 at position P2, the sunlight is reflected at an angle of reflection of angle α toward first mirror 23. Note that optical path LP from position P1 to position P2 is an optical path extending along line segment s illustrated in FIG. 2.

Sunlight reflected by display 22 falls on first mirror 23 at position P3. Position P3 is different from position P1, and is below position P1. If sunlight falls on first mirror 23 at position P3, the sunlight is reflected toward display 22.

Here, the angle of reflection of sunlight reflected at position P3 is calculated according to Expression 2 below, based on normal line n3 at position P3.

$$\text{Angle of reflection} = 2\alpha - \theta - \varphi \quad \text{(Expression 2)}$$

Here, the angle of reflection is positive when formed by rotation from normal line n3 in the counter-clockwise direction (see the arrow indicating the direction denoted by $2\alpha-\theta-\varphi$ in FIG. 3). FIG. 3 illustrates the case where the angle of reflection is positive. Note that normal line n3 is not parallel to normal line n1.

Sunlight reflected by first mirror 23 at an angle of reflection calculated according to Expression 2 falls on display 22 at position P4. Position P4 is different from position P2, and is below position P2. If sunlight falls on display 22 at position P4, the sunlight is reflected toward first mirror 23.

Here, the angle of reflection of sunlight that falls on position P4 is calculated according to Expression 3 below, based on normal line n4 at position P4.

$$\text{Angle of reflection} = 3\alpha - 2\theta - 2\varphi \quad \text{(Expression 3)}$$

Here, the angle of reflection is positive when formed by rotation from normal line n4 in the clockwise direction (see the arrow indicating the direction denoted by $3\alpha-2\theta-2\varphi$ in FIG. 3). FIG. 3 illustrates the case where the angle of reflection is positive. Note that normal line n4 is parallel to normal line n2, for example.

The shape of first mirror 23 and the orientations and positions of first mirror 23 and display 22 may be determined so that sunlight reflected at position P4 does not fall onto first mirror 23 at the lowest portion. Accordingly, the sunlight reflected at position P4 can be prevented from being reflected again by first mirror 23 toward display 22. A condition that prevents sunlight from traveling back at position P1, or in other words, a condition that prevents sunlight from reaching eye 300 is shown by Expression 4 below.

$$\theta > 0 \quad \text{(Expression 4)}$$

Reflected light at position P1 is reflected downward (for example, toward display 22) by satisfying Expression 4.

A condition that prevents sunlight from traveling back at position P2 is shown by Expression 5 below.

$$\alpha > 0 \quad \text{(Expression 5)}$$

Reflected light at position P2 is reflected downward (for example, toward the lowest portion of first mirror 23) by satisfying Expression 5.

A condition that prevents sunlight from traveling back at position P3 is shown by Expression 6 below.

$$2\alpha - \theta - \varphi > 0 \quad \text{(Expression 6)}$$

Reflected light at position P3 is reflected downward (for example, toward the lowest portion of display 22) by satisfying Expression 6. Note that a condition that angle $\alpha$ satisfies is shown by Expression 7 below, based on Expression 6.

$$0 < \alpha - (\theta + \varphi)/2 \quad \text{(Expression 7)}$$

By angle $\alpha$ satisfying Expression 7, sunlight traveling along optical path LP can be prevented from being reflected and traveling back to the driver at position P3.

A condition that prevents sunlight from traveling back at position P4 is shown by Expression 8 below.

$$3\alpha - 2\theta - 2\varphi > 0 \quad \text{(Expression 8)}$$

Reflected light at position P4 is reflected downward (for example, toward the lowest portion of first mirror 23) by satisfying Expression 8. Note that a condition that angle $\alpha$ satisfies is shown by Expression 9 below, based on Expression 8.

$$0 < \alpha - 2(\theta + \varphi)/3 \quad \text{(Expression 9)}$$

By angle $\alpha$ satisfying Expression 9, sunlight traveling along optical path LP can be prevented from being reflected and traveling back to the driver at position P4.

Figure 4:
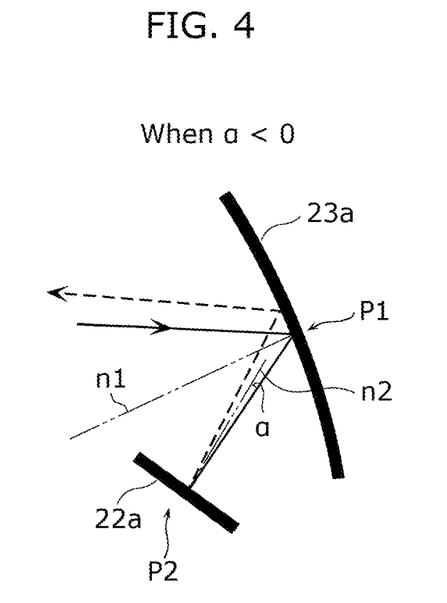
FIG. 4 is a first diagram for illustrating the case where a condition for reducing reflection of sunlight is not satisfied.
Figure 5:
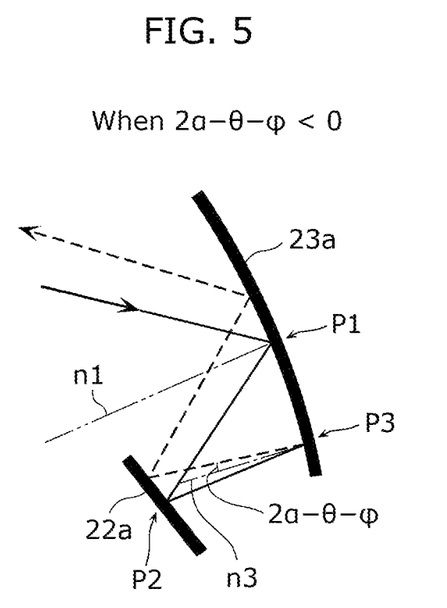
FIG. 5 is a second diagram for illustrating the case where a condition for reducing reflection of sunlight is not satisfied.
Figure 6:
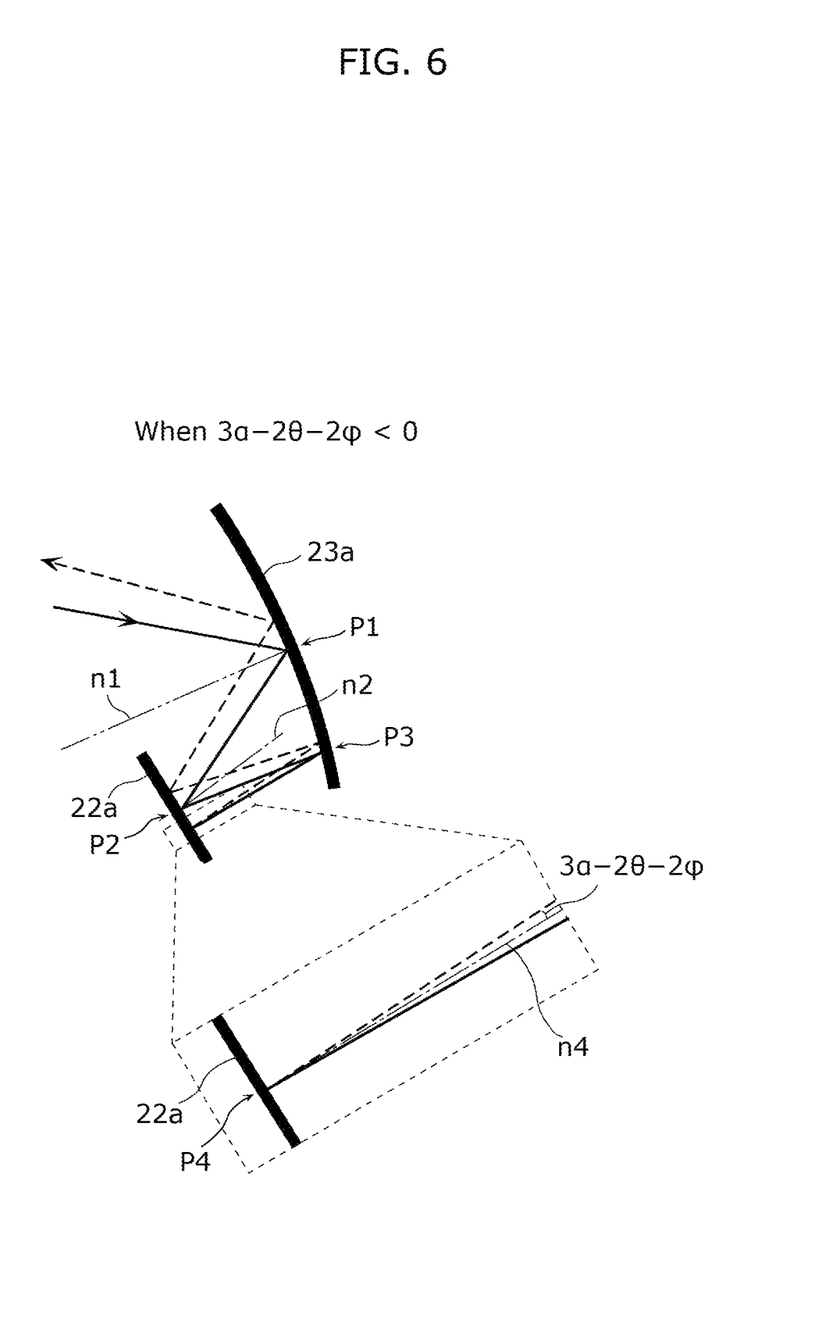
FIG. 6 is a third diagram for illustrating the case where a condition for reducing reflection of sunlight is not satisfied.

The following describes the case where the above conditions are not satisfied, with reference to FIG. 4 to FIG. 6. Note that in the following, the cases where Expressions 5, 7, and 9 above are not satisfied are to be described. Expression 4 is a condition that allows sunlight to fall on first mirror 23 from the display 22 side, which is realistically unlikely to occur, and thus a description thereof is omitted. In each of FIG. 4 to FIG. 6, incident sunlight is indicated by a solid line, and sunlight that travels back is indicated by a broken line.

FIG. 4 is a first diagram for illustrating the case where a condition for reducing reflection of sunlight is not satisfied. Specifically, FIG. 4 is a diagram for illustrating the case where Expression 5 is not satisfied.

As illustrated in FIG. 4, if angle $\alpha$ is negative, that is, when line segment s that connects position P1 and position P2 is below normal line n2 at position P2 of display 22a, reflected light at position P2 travels back. Accordingly, sunlight reaches eye 300 of the driver.

FIG. 5 is a second diagram for illustrating the case where a condition for reducing reflection of sunlight is not satisfied. Specifically, FIG. 5 is a diagram for illustrating the case where Expression 7 is not satisfied.

As illustrated in FIG. 5, if Expression 7 is not satisfied, that is, the direction of reflected light at position P3 is above normal line n3 at position P3 of first mirror 23a, reflected light at position P3 travels back. Accordingly, sunlight reaches eye 300 of the driver.

FIG. 6 is a third diagram for illustrating the case where a condition for reducing reflection of sunlight is not satisfied. Specifically, FIG. 6 is a diagram for illustrating the case where Expression 9 is not satisfied.

As illustrated in FIG. 6, if Expression 9 is not satisfied, that is, the direction of reflected light at position P4 is above normal line n4 at position P4 of display 22a, reflected light at position P4 travels back. Accordingly, sunlight reaches eye 300 of the driver. However, if the intensity of reflected light is decreased down to a level at which the intensity does not affect human bodies, Expression 9 may not be satisfied. Even if Expression 9 is not satisfied, the intensity of reflected light is decreased by the reflected light being reflected plural times. Furthermore, if head-up display 100 includes a neural density filter for lowering the amount of reflected light, Expression 9 may not be satisfied. Note that desirably, Expression 9 is satisfied from the viewpoint of preventing sunlight from reaching eye 300 of the driver and reducing the number of components such as a neural density filter.

Figure 7:
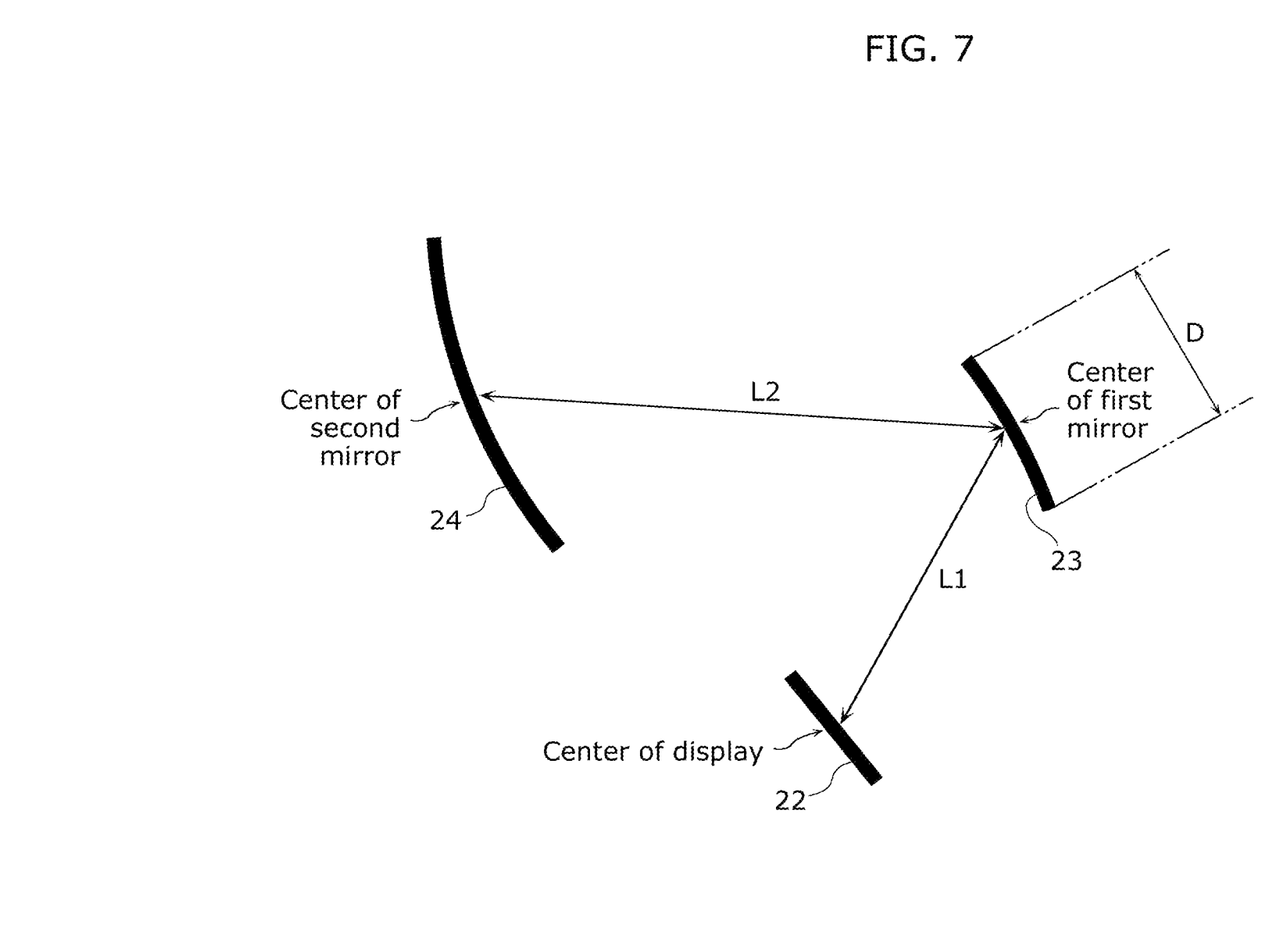
FIG. 7 illustrates a first distance between a first mirror and a display and a second distance between the first mirror and a second mirror.

Next, the distances of first mirror 23 from display 22 and second mirror 24 in head-up display 100 as described above are to be described with reference to FIG. 7. FIG. 7 illustrates first distance L1 between first mirror 23 and display 22 and second distance L2 between first mirror 23 and second mirror 24 in the embodiment.

As illustrated in FIG. 7, first distance L1 is the length of a line segment that connects the center of display 22 and the center of first mirror 23, and second distance L2 is the length of a line segment that connects the center of first mirror 23 and the center of second mirror 24. In this case, head-up display 100 desirably satisfies Expression 10 below in which first distance L1 and second distance L2 are used.

$$0.3<L1/L2<0.6 \quad \text{(Expression 10)}$$

If L1/L2 is 0.3 or less, the distance between display 22 and first mirror 23 is too short so that a light ray is blocked by display 22. Further, if L1/L2 is 0.6 or more, the distance between display 22 and first mirror 23 is too long, and thus the size of the device is increased. Thus, if L1/L2 satisfies Expression 10, the size of head-up display 100 can be decreased while preventing display 22 from blocking a light ray.

Head-up display 100 desirably satisfies Expression 11 below, when the length of first mirror 23 is D (see FIG. 7) and a virtual image distance that is the length of a line segment that connects the center of an eye box and the center of a virtual image is VID (see FIG. 9).

$$D/VID<0.04 \quad \text{(Expression 11)}$$

Note that an eye box is an image-seeable region in which a virtual image of an image can be seen. Length D is, for example, a distance between two lines that extend parallel to normal line n1 at the center of first mirror 23 from the highest portion and the lowest portion of first mirror 23.

Note that the above description states conditions that can prevent sunlight traveling along optical path LP from being reflected inside of head-up display 100 and reaching eye 300 of the driver, yet optical paths of sunlight actually include not only optical path LP, but also an optical path that does not pass through the center of first mirror 23 or display 22. In order to prevent sunlight that travels along such an optical path from being reflected inside of head-up display 100 and reaching eye 300 of the driver, a condition severer than the conditions shown by Expression 7 and Expression 9 may be set.

Considering sunlight that travels along an optical path other than optical path LP, Expression 12 below needs to be satisfied in order to prevent sunlight reflected by first mirror 23 and thereafter reflected by display 22 and again falling onto first mirror 23 from traveling back.

$$3<\alpha-(\theta+\varphi)/2<11.7 \quad \text{(Expression 12)}$$

If $\alpha-(\theta+\varphi)/2$ is 3 or less, there is a possibility that sunlight that travels along an optical path other than optical path LP is reflected by first mirror 23 and travels back. Further, if $\alpha-(\theta+\varphi)/2$ is 11.7 or more, angle $\alpha$ is large, and thus the quality of display of head-up display 100 deteriorates due to various aberrations, in particular, a curvature of field and a distortion being great so that the driver cannot clearly see a virtual image or sees a virtual image distorted.

Considering sunlight that travels along an optical path other than optical path LP, Expression 13 below needs to be satisfied in order to prevent sunlight again reflected by first mirror 23 and again falling onto display 22 from traveling back.

$$3<\alpha-2(\theta+\varphi)/3<5.7 \quad \text{(Expression 13)}$$

If $\alpha-2(\theta+\varphi)/3$ is 3 or less, there is a possibility that sunlight that travels along an optical path other than optical path LP is reflected by display 22 and travels back. Further, if $\alpha-2(\theta+\varphi)/3$ is 5.7 or more, angle $\alpha$ is large, and thus the quality of display of head-up display 100 deteriorates due to various aberrations, in particular, a curvature of field and a distortion being great so that the driver cannot clearly see a virtual image or sees a virtual image distorted.

[2. Advantageous Effects and Others]

As described above, head-up display 100 according to the present embodiment includes: display medium 10 onto which a virtual image is projected; display 22 that displays an image; and a projection optical system that forms the virtual image on a side opposite an observer across display medium 10 by guiding the image displayed by display 22 to display medium 10. The projection optical system includes first mirror 23 that is disposed above display 22 and reflects display light of the image. An expression of $0<\alpha-(\theta+\varphi)/2$ is satisfied, where $\theta$ denotes an angle between line segment s that connects a center of first mirror 23 and a center of display 22 and normal line n1 at the center of first mirror 23, $\alpha$ denotes an angle between line segment s that connects the center of first mirror 23 and the center of display 22 and normal line n2 at the center of display 22, and $\varphi$ denotes an inclination angle at an edge of first mirror 23 relative to the center of first mirror 23, the edge being closer to display 22.

Note that in the case of FIG. 2, angle $\theta$ is positive when formed by rotation from normal line n1 in the counterclockwise direction, and angle $\varphi$ is positive when formed by rotation from tangent line t1 at the center of first mirror 23 in the clockwise direction.

Note that the driver is an example of an observer, normal line n1 is an example of a first normal line, and normal line n2 is an example of a second normal line.

Accordingly, head-up display 100 can prevent sunlight traveling along optical path LP and reflected twice by first mirror 23 (sunlight reflected at position P3) from traveling back. Thus, head-up display 100 can prevent sunlight from being reflected inside and reaching eye 300 of a driver even if the size of the head-up display is reduced.

Furthermore, sunlight can be effectively prevented from being reflected inside and reaching eye 300 of the driver by disposing a neural density filter, for instance, on an optical path of reflected light. Note that sunlight reflected inside and reaching eye 300 of the driver here means that reflected light having an intensity that affects human bodies reaches the driver.

Desirably, head-up display 100 further satisfies $3<\alpha-(\theta+\varphi)/2<11.7$.

Accordingly, head-up display 100 can prevent sunlight traveling along an optical path other than optical path LP and reflected twice by first mirror 23 from traveling back. Thus, head-up display 100 can further prevent sunlight from being reflected inside and reaching eye 300 of a driver even if the size of the head-up display is reduced.

Desirably, head-up display 100 further satisfies $0<\alpha-2(\theta+\varphi)/3$.

Accordingly, head-up display 100 can prevent sunlight traveling along optical path LP and reflected twice by display 22 (sunlight reflected at position P4) from traveling back. Thus, head-up display 100 can further prevent sunlight from being reflected inside and reaching eye 300 of the driver even if the size of the head-up display is reduced.

Desirably, head-up display 100 further satisfies $3<\alpha-2(\theta+\varphi)/3<5.7$.

Accordingly, head-up display 100 can prevent sunlight traveling along an optical path other than optical path LP and reflected twice by display 22 from traveling back. Thus, head-up display 100 can further prevent sunlight from being reflected inside and reaching eye 300 of a driver even if the size of the head-up display is reduced.

Head-up display 100 further includes: second mirror 24 that reflects the display light from first mirror 23 toward display medium 10. Desirably, an expression of $0.3<L1/L2<0.6$ is satisfied, where L1 denotes a length of line segment s that connects the center of display 22 and the center of first mirror 23, and L2 denotes a length of a line segment that connects the center of first mirror 23 and a center of second mirror 24.

Accordingly, display 22 can be prevented from blocking display light from first mirror 23, and furthermore the size of head-up display 100 can be reduced.

Desirably, a reflection surface of a portion of second mirror 24 that includes the center of second mirror 24 is concave.

Accordingly, the position of a principal point of the optical system shifts along an optical path to the side opposite display 22, and thus display 22 can be brought closer to first mirror 23 so that the size of head-up display 100 can be further decreased.

Desirably, the φ satisfies φ<3 degrees.

Accordingly, the values of the right-hand sides of Expressions 7 and 9 are decreased, and thus the degrees of freedom of angles θ and α are increased.

Desirably, D/VID<0.04 is satisfied, where D denotes a length of first mirror 23 in a vertical direction, and VID denotes a length of a line segment that connects a center of an eye box and a display center of the virtual image.

Accordingly, the size of first mirror 23 is decreased, and thus the size of head-up display 100 can be further decreased. Furthermore, head-up display 100 can readily cause sunlight reflected by display 22 to travel toward a position other than first mirror 23, and thus can further prevent the reflected light from reaching eye 300 of the driver.

Desirably, at least a portion of a reflection surface of first mirror 23 at an outer edge is concave.

Accordingly, in head-up display 100, the position of a principal point of the optical system shifts toward display 22 along an optical path, and thus even if display 22 and first mirror 23 are close to each other due to, for instance, the shape of display medium 10 (for example, a windshield) and the position in which head-up display 100 is provided, the distance (for example, first distance L1) between first mirror 23 and display 22 can be increased, and display 22 can be prevented from blocking display light reflected by first mirror 23.

[Math 1]
$$z = \frac{cr^2}{\sqrt{1-(1+k)c^2 r^2}} + \sum_{j=2} c_j x^m y^n \quad \text{(Expression 14)}$$

[Math 2]
$$j = \frac{(m+n)^2 + m + 3n}{2} + 1 \quad \text{(Expression 15)}$$

Here, z denotes a sag height at the position (x, y) relative to an axis that defines a plane, r denotes a numerical value calculated by

[Math 3]
$$r = \sqrt{x^2 + y^2} \quad \text{(Expression 16)},$$

c denotes a curvature at an origin of an axis that defines a plane, k denotes a conic constant, m and n denote integers that satisfy Expression 15, and $C_j$ denotes a coefficient of $x^m y^n$ in a polynomial.

Figure 8:
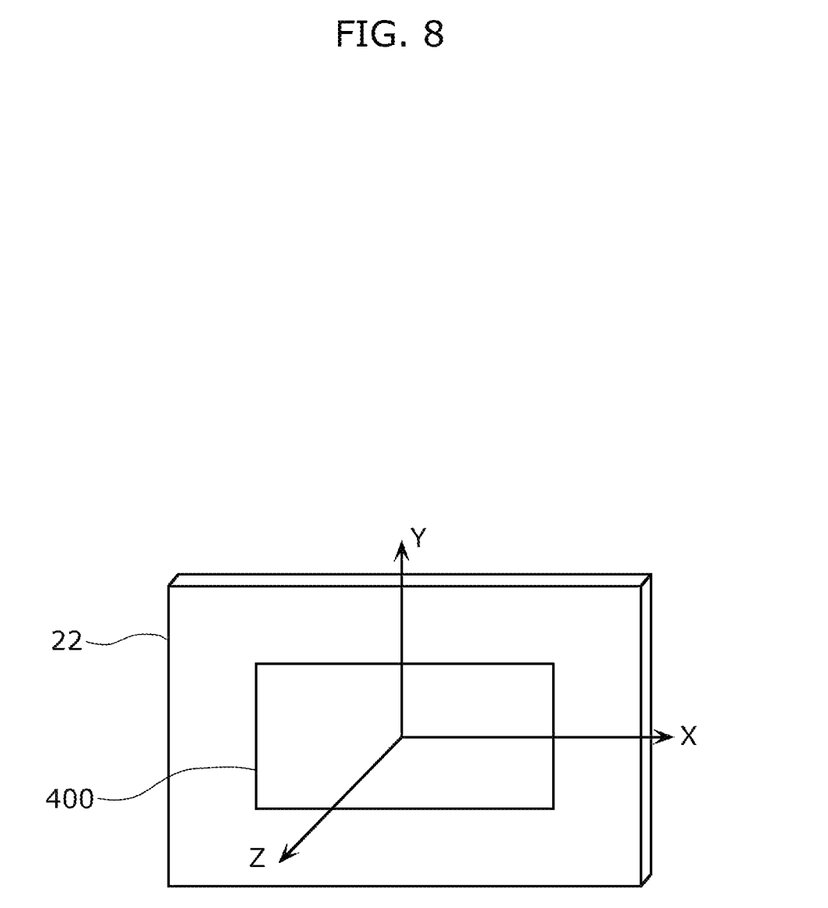
FIG. 8 is a simplified diagram illustrating a coordinate system of the display in the head-up display according to the embodiment.

In the examples of numerical values, the origin of coordinates that is a reference is the center of the display surface of display 22 (for example, the center of display image 400), and defines the X axis, the Y axis, and the Z axis as illustrated in FIG. 8. FIG. 8 is a simplified diagram illustrating a coordinate system of display 22 in head-up display 100 according to the embodiment. Note that display 22 emits display light in the negative Z axis direction illustrated in FIG. 8.

Furthermore, in the eccentricity data (see Table 1 below) in the examples of numerical values, ADE indicates the amount of rotation about the X axis from the Z axis to the Y axis, BDE indicates the amount of rotation about the Y axis from the X axis to the Z axis, and CDE indicates the amount of rotation about the Z axis from the X axis to the Y axis. For example, ADE, BDE, and CDE indicate Euler angles.

A projection optical system in the examples of numerical values is an example of a projection optical system. Table 1 shows data of elements included in the projection optical system in the examples of numerical values, and Table 2 shows coefficients of polynomial free-form surfaces. Note that "c" shown in Table 2 indicates curvature.

TABLE 1

| Surface | | | Eccentricity data | | | | | |
|---|---|---|---|---|---|---|---|---|
| | number | Shape | X | Y | Z | ADE | BDE | CDE |
| Display surface | 1 | — | 0 | 0 | 0 | 0 | 0 | 0 |
| First mirror | 2 | Free-form surface | −10.344 | 32.0858 | 55.5743 | −6.2362 | −2.8246 | −1.0008 |
| Second mirror | 3 | Free-form surface | −42.102 | 120.693 | −38.997 | −17.872 | −6.4269 | 0.6538 |
| Wind-shield | 4 | Free-form surface | −68.896 | 153.278 | 247.796 | 137.234 | −3.1467 | 6.5074 |
| Observer | 5 | — | −108.23 | −373.83 | 907.417 | 137.234 | −3.1467 | 6.5074 |

(Examples of Numerical Values)

The following describes specific examples of numerical values, regarding head-up display 100 according to the present disclosure. Note that in the examples of numerical values described below, a unit of length and a unit of angle in the tables are (mm) and (degrees), respectively. Further, a free-form surface is defined by the following mathematical expression.

TABLE 2

| Surface Number | Coefficient in polynomial | | | |
|---|---|---|---|---|
| 2 | C | | 0 | |
| | k | 0.0000.E+00 | C19 | 0.0000.E+00 |
| | C2 | 0.0000.E+00 | C20 | 0.0000.E+00 |

TABLE 2-continued

| Surface Number | Coefficient in polynomial | | | |
|---|---|---|---|---|
| | C3 | 0.0000.E+00 | C21 | 0.0000.E+00 |
| | C4 | −7.3080.E−04 | C22 | 0.0000.E+00 |
| | C5 | 1.0185.E−04 | C23 | 0.0000.E+00 |
| | C6 | −7.0785.E−04 | C24 | 0.0000.E+00 |
| | C7 | 3.7474.E−06 | C25 | 0.0000.E+00 |
| | C8 | 1.2619.E−06 | C26 | 0.0000.E+00 |
| | C9 | −2.5831.E−07 | C27 | 0.0000.E+00 |
| | C10 | −7.7749.E−08 | C28 | 0.0000.E+00 |
| | C11 | 0.0000.E+00 | C29 | 0.0000.E+00 |
| | C12 | 0.0000.E+00 | C30 | 0.0000.E+00 |
| | C13 | 0.0000.E+00 | C31 | 0.0000.E+00 |
| | C14 | 0.0000.E+00 | C32 | 0.0000.E+00 |
| | C15 | 0.0000.E+00 | C33 | 0.0000.E+00 |
| | C16 | 0.0000.E+00 | C34 | 0.0000.E+00 |
| | C17 | 0.0000.E+00 | C35 | 0.0000.E+00 |
| | C18 | 0.0000.E+00 | C36 | 0.0000.E+00 |
| 3 | C | | | 4.7772.E−03 |
| | k | 0.0000.E+00 | C19 | −4.0311.E−11 |
| | C2 | 0.0000.E+00 | C20 | 2.9812.E−11 |
| | C3 | 0.0000.E+00 | C21 | 5.2361.E−12 |
| | C4 | −1.5132.E−03 | C22 | −3.3146.E−13 |
| | C5 | 1.4752.E−04 | C23 | 1.0850.E−13 |
| | C6 | −1.8330.E−03 | C24 | −8.5725.E−13 |
| | C7 | 6.0329.E−07 | C25 | 8.6594.E−14 |
| | C8 | −8.6303.E−07 | C26 | −4.9513.E−13 |
| | C9 | 1.7546.E−07 | C27 | −3.7438.E−13 |
| | C10 | −8.4604.E−08 | C28 | −2.0876.E−12 |
| | C11 | −1.2626.E−08 | C29 | 0.0000.E+00 |
| | C12 | 4.3107.E−10 | C30 | 0.0000.E+00 |
| | C13 | −2.6511.E−08 | C31 | 0.0000.E+00 |
| | C14 | 1.9076.E−10 | C32 | 0.0000.E+00 |
| | C15 | −1.0384.E−08 | C33 | 0.0000.E+00 |
| | C16 | 1.0241.E−11 | C34 | 0.0000.E+00 |
| | C17 | −4.2242.E−12 | C35 | 0.0000.E+00 |
| | C18 | 8.9923.E−12 | C36 | 0.0000.E+00 |
| 4 | C | | | −2.6339.E−03 |
| | k | 0.0000.E+00 | C19 | 1.9466.E−12 |
| | C2 | 2.0443.E−01 | C20 | 4.0836.E−12 |
| | C3 | 1.9694.E−00 | C21 | 3.7668.E−12 |
| | C4 | 8.2889.E−04 | C22 | 6.0334.E−16 |
| | C5 | 4.2231.E−05 | C23 | −1.0522.E−15 |
| | C6 | 6.5757.E−04 | C24 | 1.3216.E−14 |
| | C7 | 1.9996.E−07 | C25 | −3.3785.E−15 |
| | C8 | 1.4934.E−07 | C26 | 4.9420.E−15 |
| | C9 | 8.5532.E−08 | C27 | −1.3913.E−14 |
| | C10 | 6.6016.E−07 | C28 | −3.0638.E−15 |
| | C11 | 1.4564.E−09 | C29 | 0.0000.E+00 |
| | C12 | −5.8985.E−10 | C30 | 0.0000.E+00 |
| | C13 | 2.6300.E−09 | C31 | 0.0000.E+00 |
| | C14 | −3.1174.E−10 | C32 | 0.0000.E+00 |
| | C15 | 1.1479.E−10 | C33 | 0.0000.E+00 |
| | C16 | −8.3368.E−14 | C34 | 0.0000.E+00 |
| | C17 | 3.4915.E−13 | C35 | 0.0000.E+00 |
| | C18 | 1.2691.E−12 | C36 | 0.0000.E+00 |

Table 3 shows examples of a display size of an image, a virtual image size, virtual image distance VID that is a distance between the center of an image-seeable region of an observer (for example, the center of an eye box) and the center of a virtual image, and an eye box size.

TABLE 3

| | | Example |
|---|---|---|
| Virtual image size | X | 7 |
| (deg.) | Y | 3 |
| VID (mm) | | 2200 |
| Eye box size (mm) | X | 130 |
| | Y | 50 |
| $\alpha - (\theta + \varphi)/2$ | | 11.15 |
| $\alpha - 2(\theta + \varphi)/3$ | | 4.46 |
| L1/L2 | | 0.49 |
| $\varphi$ | | 2.10 |
| D/VID | | 0.033 |

Note that as examples, angle $\alpha=31.2028°$, angle $\theta=38.0078°$, and angle $\varphi=2.099°$. As examples, first distance L1=65 mm, and second distance L2=133 mm. As examples, length D=72.6908 mm, and virtual image distance VID=2200 mm.

Other Embodiments

The above is a description of the head-up display according to the present disclosure, based on the embodiment above, yet the present disclosure is not limited to the above embodiment. For example, the present disclosure also includes embodiments as a result of adding various modifications that may be conceived by those skilled in the art to the embodiment, and embodiments obtained by combining elements and functions in the embodiment as long as the combination does not depart from the scope of the present disclosure.

For example, the above embodiment has described an example in which display medium 10 is a windshield, yet display medium 10 may be a combiner.

Further, the above embodiment has described an example in which the projection optical system of head-up display 100 includes two mirrors (first mirror 23 and second mirror 24), yet the number of mirrors is not limited thereto. The projection optical system may include only one mirror, or alternatively, may include three or more mirrors. The projection optical system may include a lens.

Further, the above embodiment has described an example in which the reflection surfaces of first mirror 23 and second mirror 24 are concave, yet the shape is not limited thereto. At least one of the reflection surfaces of first mirror 23 and second mirror 24 may be convex. Further, at least one of the reflection surfaces of first mirror 23 and second mirror 24 may be a free-form surface or may be a flat surface.

Further, the above embodiment has described an example in which head-up display 100 is provided in vehicle 30, but head-up display 100 may be provided in a movable body other than vehicle 30. Head-up display 100 may be provided in, for example, a train or an aircraft, for instance. Furthermore, head-up display 100 may be provided in an object other than a movable body.

Further Information about Technical Background to this Application

The disclosures of the following Japanese Patent Applications including specifications, drawings and claims are incorporated herein by reference in their entirety: Japanese Patent Application No. 2020-23267 filed on Feb. 14, 2020 and Japanese Patent Application No. 2020-185448 filed on Nov. 5, 2020.

INDUSTRIAL APPLICABILITY

The present disclosure is applicable to a head-up display provided in a vehicle, for example.

What is claimed is:
1. A head-up display, comprising:
a display that displays an image; and
a projection optical system that forms a virtual image, wherein the projection optical system includes a first mirror and a second mirror, the first mirror being disposed above the display and reflecting display light of the image, the second mirror reflecting the display light from the first mirror toward a display medium onto which the virtual image is projected, and a first expression of $0.3<L1/L2<0.6$ is satisfied, where L1 denotes a length of a line segment that connects a center of the display and a center of the first mirror, and L2 denotes a length of a line segment that connects the center of the first mirror and a center of the second mirror, wherein the second mirror is disposed above the display and below the display medium.

2. The head-up display according to claim 1,
wherein a reflection surface of a portion of the second mirror that includes the center of the second mirror is concave.

3. The head-up display according to claim 1,
wherein a second expression of $D/VID<0.04$ is satisfied, where D denotes a length of the first mirror in a vertical direction, and VID denotes a length of a line segment that connects a center of an eye box and a display center of the virtual image.

4. The head-up display according to claim 1,
wherein at least a portion of a reflection surface of the first mirror at an outer edge is concave.

5. The head-up display according to claim 1,
wherein the second mirror has a free form surface, and a third expression and a fourth expression are satisfied, where the third expression is $$z = \frac{cr^2}{\sqrt{1-(1+k)c^2r^2}} + \sum_{j=2} c_j x^m y^n,$$

the fourth expression is $$j = \frac{(m+n)^2 + m + 3n}{2} + 1,$$

z denotes a sag height at a position (x, y) relative to an axis that defines a plane,
r denotes a numerical value calculated by a sixth expression that is satisfied,
the sixth expression is $r=\sqrt{x^2+y^2}$,
c denotes a curvature at an origin of an axis that defines a plane,
k denotes a conic constant,
m and n denote integers that satisfy the fourth expression,
Cj denotes a coefficient of $x^m y^n$ in a polynomial, and
an absolute value of Cj is less than or equal to 1.9694.

6. A head-up display, comprising:
a display that displays an image; and
a projection optical system that forms a virtual image, wherein the projection optical system includes a first mirror that is disposed above the display and reflects display light of the image;
$\phi$ satisfies a seventh expression of $\phi<3$ degrees, where $\phi$ denotes an inclination angle at an edge of the first mirror relative to the center of the first mirror, and wherein $\phi$ is non-zero.

7. The head-up display according to claim 6,
wherein the projection optical system includes a second mirror that reflects the display light from the first mirror toward a display medium onto which the virtual image is projected.

8. The head-up display according to claim 7,
wherein a reflection surface of a portion of the second mirror that includes a center of the second mirror is concave.

9. The head-up display according to claim 6,
wherein an eighth expression of $D/VID<0.04$ is satisfied, where D denotes a length of the first mirror in a vertical direction, and VID denotes a length of a line segment that connects a center of an eye box and a display center of the virtual image.

10. The head-up display according to claim 6,
wherein at least a portion of a reflection surface of the first mirror at an outer edge is concave.

11. The head-up display according to claim 7,
wherein the second mirror is disposed above the display and below the display medium.

12. The head-up display according to claim 7,
wherein the second mirror has a free form surface, and a ninth expression and a tenth expression are satisfied, where the ninth expression is $$z = \frac{cr^2}{\sqrt{1-(1+k)c^2r^2}} + \sum_{j=2} c_j x^m y^n,$$

the tenth expression is $$j = \frac{(m+n)^2 + m + 3n}{2} + 1,$$

z denotes a sag height at a position (x, y) relative to an axis that defines a plane,
r denotes a numerical value calculated by an eleventh expression that is satisfied,
the eleventh expression is $r=\sqrt{x^2+y^2}$,
c denotes a curvature at an origin of an axis that defines a plane,
k denotes a conic constant,
m and n denote integers that satisfy the tenth expression,
Cj denotes a coefficient of $x^m y^n$ in a polynomial, and
an absolute value of Cj is less than or equal to 1.9694.

13. A head-up display, comprising:
a display that displays an image; and
a projection optical system that forms a virtual image, wherein the projection optical system includes a first mirror that is disposed above the display and reflects display light of the image, and
a twelfth expression of $\theta<\alpha$ is satisfied, where $\theta$ denotes an angle between a line segment that connects a center of the first mirror and a center of the display and a first normal line at the center of the first mirror, and $\alpha$ denotes an angle between the line segment that connects the center of the first mirror and the center of the display and a second normal line at the center of the display.

14. The head-up display according to claim 13,
wherein the projection optical system includes a second mirror that reflects the display light from the first mirror toward a display medium onto which the virtual image is projected.

15. The head-up display according to claim 14,
wherein a reflection surface of a portion of the second mirror that includes a center of the second mirror is concave.

16. The head-up display according to claim 13,
wherein a thirteenth expression of D/VID<0.04 is satisfied, where D denotes a length of the first mirror in a vertical direction, and VID denotes a length of a line segment that connects a center of an eye box and a display center of the virtual image.

17. The head-up display according to claim 13,
wherein at least a portion of a reflection surface of the first mirror at an outer edge is concave.

18. The head-up display according to claim 14,
wherein the second mirror is disposed above the display and below the display medium.

19. The head-up display according to claim 14,
wherein the second mirror has a free form surface, and a fourteenth expression and a fifteenth expression are satisfied, where the fourteenth expression is $$z = \frac{cr^2}{\sqrt{1-(1+k)c^2r^2}} + \sum_{j=2} c_j x^m y^n,$$

the fifteenth expression is $$j = \frac{(m+n)^2 + m + 3n}{2} + 1,$$

z denotes a sag height at a position (x, y) relative to an axis that defines a plane,
r denotes a numerical value calculated by a sixteenth expression that is satisfied,
the sixteenth expression is $r = \sqrt{x^2+y^2}$,
c denotes a curvature at an origin of an axis that defines a plane,
k denotes a conic constant,
m and n denote integers that satisfy the fifteenth expression,
Cj denotes a coefficient of $x^m y^n$ in a polynomial, and
an absolute value of Cj is less than or equal to 1.9694.

* * * * *